United States Patent
Zhang et al.

(10) Patent No.: US 8,750,567 B2
(45) Date of Patent: *Jun. 10, 2014

(54) ROAD STRUCTURE DETECTION AND TRACKING

(75) Inventors: Wende Zhang, Troy, MI (US); Jinsong Wang, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

This patent is subject to a terminal disclaimer.

(21) Appl. No.: 13/441,963

(22) Filed: Apr. 9, 2012

(65) Prior Publication Data

US 2013/0266175 A1  Oct. 10, 2013

(51) Int. Cl.
*G06K 9/00* (2006.01)
*H04N 7/18* (2006.01)

(52) U.S. Cl.
USPC .......................... 382/103; 382/224; 344/148

(58) Field of Classification Search
CPC ......... B60W 40/04; G06K 9/00; G06T 7/401; H04N 7/18
USPC ......... 382/100, 103–107, 162, 168–173, 181, 382/193–199, 209, 224, 232, 254, 274, 276, 382/286–289, 305, 312, 176; 348/148; 701/37; 707/802

See application file for complete search history.

(56) References Cited

U.S. PATENT DOCUMENTS

| | | | | |
|---|---|---|---|---|
| 7,835,578 | B2 * | 11/2010 | Cheng et al. | 382/176 |
| 8,145,677 | B2 * | 3/2012 | Al-Shameri | 707/802 |
| 8,436,902 | B2 * | 5/2013 | Kuehnle | 348/148 |
| 2007/0021886 | A1 * | 1/2007 | Miyajima | 701/37 |
| 2011/0074955 | A1 * | 3/2011 | Kuehnle | 348/148 |
| 2013/0265424 | A1 * | 10/2013 | Zhang et al. | 348/148 |

* cited by examiner

*Primary Examiner* — Seyed Azarian

(57) ABSTRACT

Method for detecting road edges in a road of travel for clear path detection. Input images are captured at various time step frames. An illumination intensity image and a yellow image are generated from the captured image. Edge analysis is performed. The line candidates identified in a next frame are tracked. A vanishing point is estimated in the next frame based on the tracked line candidates. Respective line candidates are selected in the next frame. A region of interest is identified in the captured image for each line candidate. Features relating to the line candidate are extracted from the region of interest and input to a classifier. The classifier assigns a confidence value to the line candidate identifying a probability of whether the line candidate is a road edge. The potential line candidate is identified as a reliable road edge if the confidence value is greater than a predetermined value.

20 Claims, 5 Drawing Sheets

ROAD STRUCTURE DETECTION AND TRACKING

BACKGROUND OF INVENTION

An embodiment relates generally to identifying road structure for detecting clear path of travel.

Vision-imaging systems are used in vehicles for enhancing applications within the vehicle such as autonomous driving system or semi-autonomous driving systems. Such systems may be used to autonomously or semi-autonomously control the vehicle through steering systems, throttle control, braking control, or even utilized for lane departure warning systems.

Clear path detection systems identify a clear path in which to operate a vehicle traveling along a road. The path of travel is sensed for objects, including all non-road surfaces, so that the vehicle may travel along an uninterrupted path of travel. Features within an image may be detected and analyzed according to their form and relationship to the roadway. However, such methods may be slow due to intense data processing or the inability to distinguish clear path features and non-clear path features. Moreover, analyzing an entire image for detecting the clear path is also time consuming and data processing intensive.

SUMMARY OF INVENTION

An advantage of an embodiment is the identification of a road structure within the captured image which provides a targeted region to perform clear path detection therein. Identifying a targeted region within the image not only accelerates the overall processing time for detecting the clear path, but it reduces the chances or false alarms of incorrectly identifying clear path. The embodiments described herein generate an illumination intensity image and a yellow image for line clusters within the image. The line clusters from the illumination intensity image and the yellow image are merged and potential line candidate detection is performed on the merged clusters. A vanishing point in the image is identified. Line tracking and vanishing point tracking is performed for refining the identification of the vanishing point and potential line candidates. The line candidates are then provided to a classifier for identifying whether the line candidate is a road edge. The identified road edges are then utilized to define a boundary of the road for assisting clear path detection.

An embodiment contemplates a method of detecting road edges in a road of travel for clear path detection. Input images of a scene exterior of the vehicle are captured utilizing an image capture device. The input images are captured at various time step frames. A transformed image from the captured image is generated. Edge analysis is performed on the transformed image for detecting line candidates. An initial vanishing point is identified in the captured image as a function of the line candidates. The line candidates identified in a next frame are tracked. A vanishing point in the next frame is estimated based on the tracked line candidates. Respective line candidates in the next frame that are associated with the vanishing point of the next frame are selected. A region of interest is identified in the captured image for each line candidate. Each region of interest includes a respective line candidate and a surrounding region of the respective line candidate. Features relating to the line candidate from the region of interest are extracted. The extracted features are input to a classifier for identifying whether the line candidate is a potential road edge. The classifier assigns a confidence value to the line candidate that identifies a probability of whether the line candidate is a road edge. The potential line candidate is identified as a reliable road edge based on the confidence value being greater than a predetermined value.

DETAILED DESCRIPTION

Figure 1:
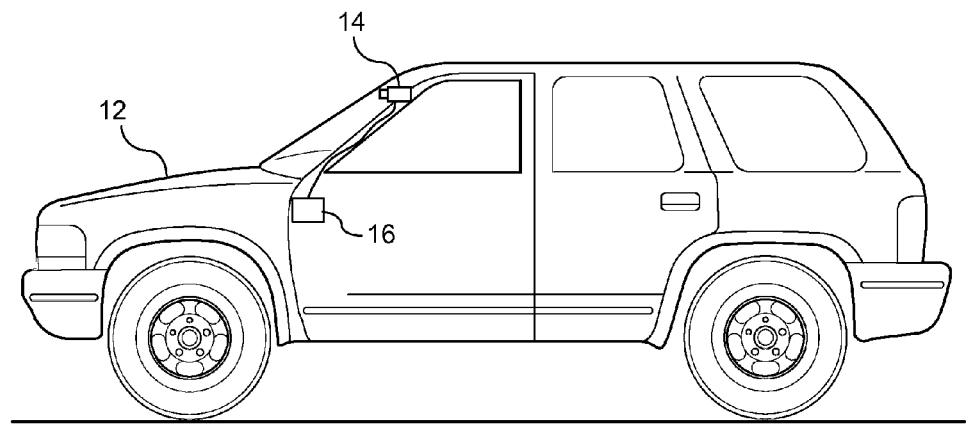
FIG. 1 is a pictorial illustration of a vehicle integrating a clear path detection system.

There is shown in FIG. 1 a vehicle 12 integrating a road edge detection system for identifying a clear path of travel. The road edge detection system includes an image capture device 14 mounted to the vehicle 12. The image capture device 14 is in communication with a processing unit 16.

The image capture device 14 may include a camera or other imaging device that captures images of the road of travel. The image capture device 14 captures images forward of the vehicle that are used to identify a clear path of travel. Preferably, the image capture device 14 is configured for performing continuous image capture. The images captured by the image capture device 14 may be stored in a memory of the image capture device 14, transferred to an off-board memory device, or may be transferred to the processing unit 16 for analysis. Moreover, more than one image capture device may be used in order to capture images rearward and/or on both sides of the vehicle for clear path detection. With a surrounding view system, four wide field-of-view (180 degree+) cameras and forward looking narrow field-of-view (~50 degrees) camera perform clear path detection. Images captured rearward of the vehicle may be used in the analysis for identifying the clear path of the road of travel forward of the vehicle.

The captured images are preferably a two-dimensional image of know pixel dimensions. The image contains a plurality of identifiable pixels. Each of the pixels includes a set of bits that correspond to a color on a predetermined color map that represents a color intensity value.

The processing unit 16 as illustrated in FIG. 1 is a single unit; however, it should be understood that functions of the processing unit 16 may be performed by one or more devices implemented in software, hardware, and/or application-specific integrated circuitry. The processing unit 16, may be a general purpose processor, digital computer including a central microprocessor or central processing unit, ASIC, or other processing module having non-volatile memory, read only memory, programmable read only memory, RAM, A-to-D circuitry, D-to-A circuitry, input/output circuitry, buffering capability and appropriate signal conditioning such as digital signal processing. The processing unit 16 is devised to execute algorithms utilizing inputs from the devices described herein as well as other devices or systems within the vehicle.

The processing unit 16 determines a clear path in the captured image. The clear path is utilized in guiding the vehicle along the road of travel. The processing unit 16 may perform the guidance functions as described above or may transfer the results to a secondary application that performs the guidance functions.

Figure 2:
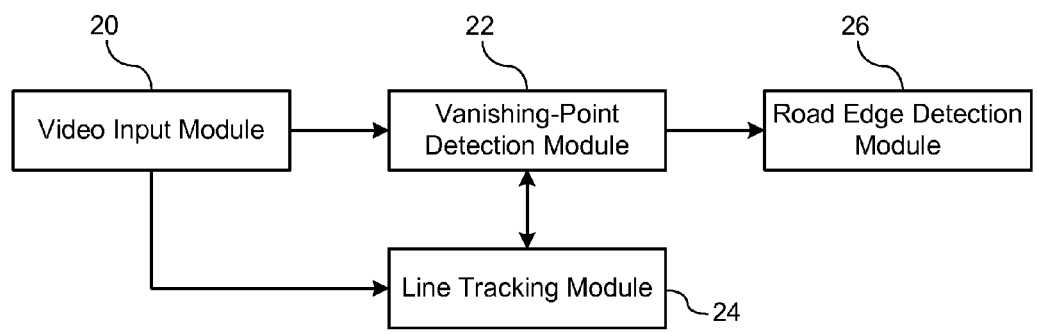
FIG. 2 illustrates a block diagram of a broad overview for the road structure detection and tracking technique.

FIG. 2 illustrates a block diagram of a broad overview for a road structure detection and tracking technique that is used to identify road edges used as boundaries for identifying a region in assisting a clear path detection technique. A video input module 20 is coupled to a line clustering and vanishing-point detection module 22 and a vanish-point and line tracking module 24.

The video input module 20 includes the image capture device that captures images forward and/or rearward of the vehicle used in identifying a clear path of travel. The images captured include the road of travel and features that assist in identifying road boundaries.

The line-clustering and vanishing point detection module 22 identifies line candidates within the captured image based on vanishing point detection and line clustering.

The vanishing point and line tracking module 24 tracks the line candidates of the road structure detected in a previous frame and tracks the road structure in the next frame. The vanishing point and line tracking module 24 and the line-clustering and vanishing point detection module 22 cooperatively communicate and exchange information for identifying potential road structure candidates.

The results from the line-clustering and vanishing point detection module 22 are output to a learning-based road edge detection module 26. The learning-based road edge detection module 26 performs classification on the identified road structure based on a pre-trained road-edge model for outputting a reliable decision as to the road edges.

Figure 3:
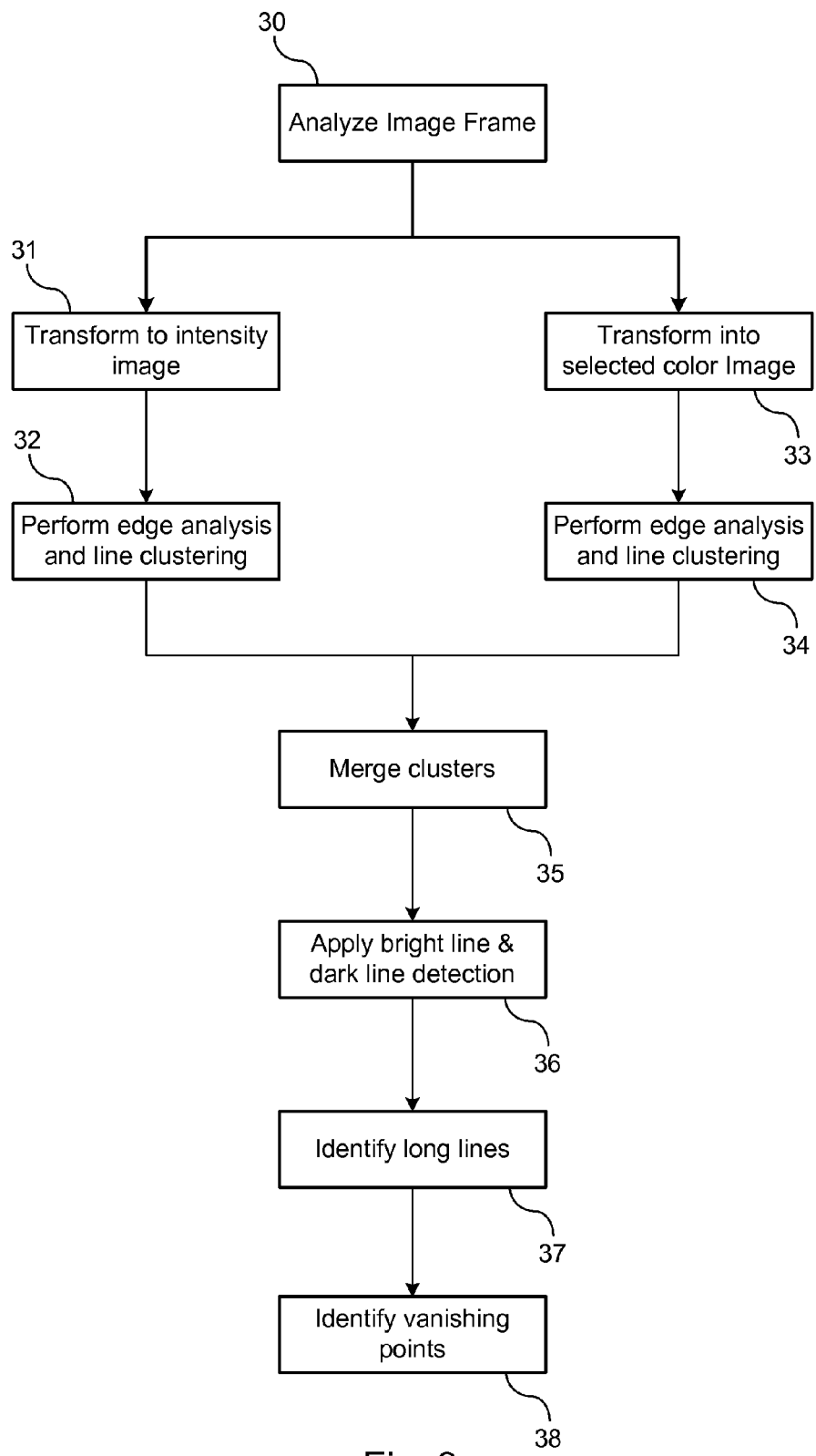
FIG. 3 illustrates a flowchart of a method for line detection and vanishing point detection.

FIG. 3 illustrates a flowchart illustrating the process for performing line detection and vanishing point detection. In step 30, an image frame from the captured video is analyzed. The selected frame is transmitted to two different channels for independent processing of the image for detecting potential line candidates. Line candidates as defined herein refers to a potential road edge that includes, but is not limited to, lane markings, road curbs, grass edges, gravel edges, or any other feature that defines a border for a road or lane.

In step 31, the selected image is transmitted to a first channel for transforming the image to an illumination intensity image.

In step 32, edge analysis and line-clustering is performed on the illumination intensity image. The edge analysis and line clustering technique applies edge-based filters to features of the captured image for enhancing edge detection of a respective line candidate by generating differentiating responses within the captured image. The differentiating responses assist in distinguishing pixels associated with the line candidate (e.g., lane marker) from pixels associated with the non-line candidate (e.g., unmarked ground segments). Edge filters (e.g., Sobel filter) is applied on the illumination intensity image to obtain vertical and horizontal gradients, which are then used to determine gradient magnitude and gradient angle. The gradient magnitude of each pixel is compared with a threshold to extract edge points which have a gradient magnitude larger than a predetermined threshold. The edge analysis identifies pixels associated with edges in the image data and then utilizes edge pixels in the image to determine a potential line candidate.

To group potential pixels associated with a potential lane marker or road curb based on illumination intensity of the pixels, line clustering of edge pixels is utilized. Line clustering involves scanning the edge pixels one by one. For each edge pixel, the surrounding area of a respective pixel is searched for other edge pixels which have similar gradient angle to the respective pixel. The pixels having similar gradient angles are grouped together and assigned a same line index. After scanning and grouping each of the pixels, line groups which have a respective length and vertical direction spreading are extracted and identified as potential line clusters for further processing. Horizontal lines are not processed since such lines are not likely to be a component of road structure.

In step 33, the original captured input image is transformed into a yellow image from a RGB or Yuv color image. Each pixel within the original captured input image is based on a red-green-blue (RGB) or Yuv (YCbCr) color model. The yellow image is selected and utilized because of the low contrast between the yellow lane markers and the road surface in the intensity image since both have similar intensities, which makes the yellow lane maker not easy to detect. To detect yellow lane markers, a respective transform $(Cr-Cb)*\sqrt{Y}$ is utilized which enhances the contrast between yellow lane marker and road surface. The transform $(Cr-Cb)*\sqrt{Y}$ makes the grayish or bluish road surface darker while the yellowish lane marker brighter. As a result, the yellow lane marker shows up as a bright stripe in this transformed image. An alternative algorithm can be used which utilizes only one transformed image to replace the illumination intensity image and yellow image. A transformed image channel is used that is the average of red and green channels $$\left(\frac{R+G}{2}\right),$$

which can detect all lane markers and dark stripes, and saves on processing time by eliminating one channel processing and the line clusters merge step.

In step 34, edge analysis and line-clustering is performed on the yellow image identified in step 33. The same technique for edge analysis and line clustering as described in step 32 is used herein.

In step 35, line clusters identified from the illumination intensity image and the yellow image are merged. That is, the detected line clusters from the illumination intensity image and the yellow image may have some overlap, which means one line can be detected in both images. As a result, the detected line clusters are merged to form one line cluster that includes all lines detected from both images and eliminates redundant line detection. To merge the respective line clusters, a line distance and a line gradient angle similarity is checked between each line from one cluster (yellow image line cluster) to lines from one other cluster (intensity image line cluster). A merge into one line cluster is performed if each cluster is in close proximity to one another and both clusters are substantially similar in gradient angle. By utilizing two images for line detection and after performing line cluster merging, all lines belonging to a road in a normal road scene should be detected. All the following road structure lines detection and tracking, such as "bright stripes" for potential lane markers, "dark strips" for potential curbs, and "long lines" for other potential road edges or road lines, as well as the vanishing point detection and tracking are based on this merged line cluster.

In step 36, bright line strip detection and dark line strip detection are applied to the merged line clusters. Bright line strips represent potential lane markers whereas dark line strips represent potential road curbs. Lines on a road usually have some specific attributes. For example, a lane marker is usually a white or yellow narrow stripe (short or long) which has two parallel bonding lines on sides, and is brighter than surrounding road surface. A road curb may have self shadow on the vertical surface (perpendicular to the road ground)

which is darker than surrounding surfaces. On some highway and rural roads, a road edge is usually defined by a transition edge between road surface and non-road surface (i.e. grass, sand, or plants). This transition edge is usually represented by a single long line which is parallel to the road lane orientation. On a structured road, lanes are defined by the aforementioned lane markers, curbs, or other road edges, which are all parallel to road orientation and separated at a certain distance which equals to lane width. The detection of bright strips, dark strips, and long lines in the captured image which are the candidates for lane markers, curbs, and other road edges are required for determining road structure.

For each detected line in the merged line cluster, the average gradient (over all pixels on a line) represents the angle and magnitude of the intensity transition from one side of the line to the other side. A bright strip has a dark-bright-dark transition. Therefore, if two lines are in close proximity (as close to a lane marker width), are substantially parallel (on ground plane) to each other, and have opposite gradients facing outward, then the two lines form a line pair which bonds a bright strip which could be a lane marker candidate. Similarly, a dark strip has bright-dark-bright transition. If a close, substantially parallel line pair has opposite gradient facing inward, it bonds a dark strip which could be a curb candidate.

In step 37, long lines in the captured image are also identified. If a detected line is determined to have a length that extends a substantial distance in the image, then there is an indication that the line candidate is a line associated with a road structure. A single long line is defined as a line which is spread a long distance in y axis (assuming vehicle heading direction is similar to road orientation) on the projected ground plane, and has no neighbor line which is close and has opposite gradient. These single long lines could be the candidate of some road edges In step 38, a vanishing point is identified based on line candidate results. An initial vanishing point is estimated based on the identified bright strips and the long dark strips. In addition, other dark strips and single long lines are identified for refining the vanishing point. Lines terminating that are in close proximity to the estimated initial vanishing point are selected for refining the vanishing point. As a result, the road structure is identified based on the detected lines as described herein.

Figure 4:
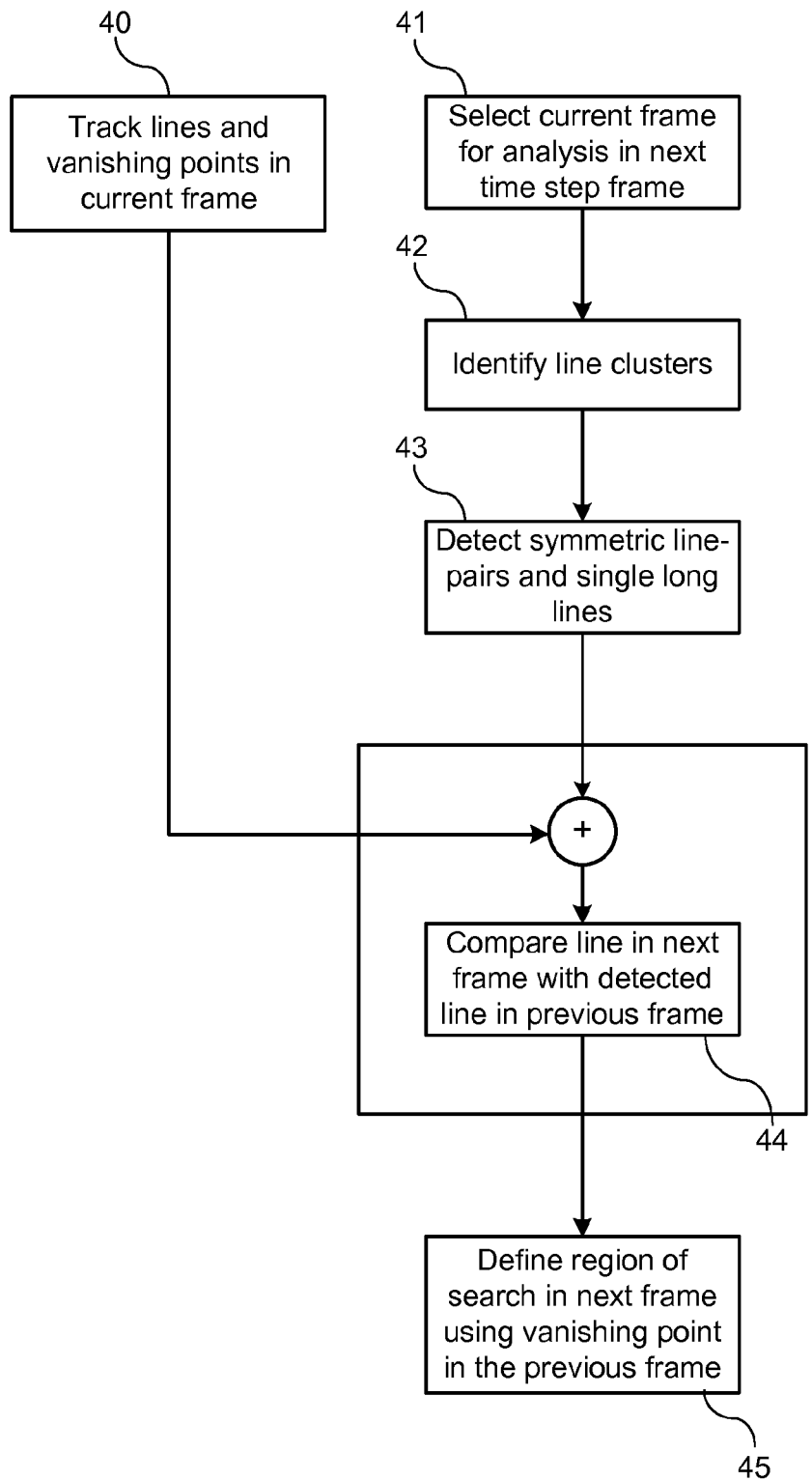
FIG. 4 illustrates a road structure tracking technique.

FIG. 4 illustrates a road structure tracking technique. In step 40, the road structure as detected in the previous frame is used to track lines and vanishing points in the current frame. That is, vanish points and lines that were found to be in close range with the estimated vanishing point of the previous frame are tracked in the current frame. As a result, vanishing points and lines pass vanishing point in the previous frame are used to define a region of search in the current frame for identifying a vanishing point in the next frame.

In step 41, a current frame is selected for analyzing the captured image of the next time step frame. The color image is transformed to obtain the illumination intensity image and yellow image.

In step 42, line clusters are identified from the illumination intensity image and the yellow image. The line candidate clusters are thereafter merged.

In step 43, symmetric line-pairs in addition to single long lines are detected in the next frame.

In step 44, a line in the next frame is compared with a detected line in the previous frame (from step 40). A line in the next frame that matches a pass-vanishing point line in the previous frame will be identified as a candidate for vanishing point estimation. It is understood that road structure should not change abruptly from one frame to the next (at high frame rate (>=10 fps), and/or with the self-vehicle movement compensation). Hence, the road structure detected in current frame can help road structure detection in a next frame. For example, vanishing point detection can be constrained in a small neighbor region of a vanishing point detected in previous frame. Moreover, if a pass-VP (vanishing point) line in previous frame matches a line in the current frame which is close in location and has similar features, then this matched line in current frame will be a successful tracking of the pass-VP line in previous frame, and used for vanishing point detection and road edge detection in current frame. In addition, to assistance in road structure detection, tracking can also enhance the road structure detection accuracy/confidence. For instance, a road edge line which is detected and successfully tracked in several continuous frames is more likely to be a real road edge than a line which only appears in one frame.

In step 45, the vanishing point in the previous frame is used to define the region of search in the next frame. That is, the region within the captured image in proximity to the vanishing point of the previous frame is used to refine the search area for the estimated vanishing point in the next frame. Since the vanishing point of the next frame should not vary too much from the previous frame, requiring the estimated vanishing point in the next frame to be within a respective range from the vanishing point in the previous frame prevents skewed results of mis-identifying the vanishing point at some location remote from the previous vanishing point.

The vanishing point (VP) tracking is implemented as follows. The location (u,v) of a VP detected in a previous frame is defined as the initial location of VP in current frame. A small search window around the initial VP location is defined as the VP detection region. All VP candidates which fall in this region are evaluated. Each VP candidate is associated with a score that is calculated based on the number of crossing lines and line length. The VP candidate with a highest score and falls in the window is detected as the vanishing point. By defining the initial location and search window, VP tracking eliminates all line crossing points that fall outside the search window, and as a result, reduces processing time and improves the robustness in VP detection.

The pass-VP line tracking is implemented as following. A pass-VP line is compared to each line in a detected line cluster. A matching score is defined for each line pair as a function of their distance, gradient angle, and line orientation similarities. In contrast to road structure detection which must go through bright & dark stripes/long lines detection to select lane candidates for VP and road structure detection, a successfully tracked line in road structure tracking is directly selected as line candidate for VP estimation and road structure detection.

Road structure tracking is not a replacement of road structure detection. Instead both tracking and detection is applied in each consequent frame to complement one another. Tracking can help line candidate selection and enhance their confidences, as well as refine the vanishing point search region to save VP detection effort, while detection find the lines and vanish point to track. The results generated from the road structure tracking technique in FIG. 4 are provided as feedback to the road structure detection technique described in FIG. 3, and vice-versa. The detection results from the road structure detection technique of the previous frame are used by the road structure tracking technique to estimate the vanishing points of the next frame. In addition, the tracking results from the road structure tracking technique are used as evidence to identify road structure lines in the next frame.

Figure 5:
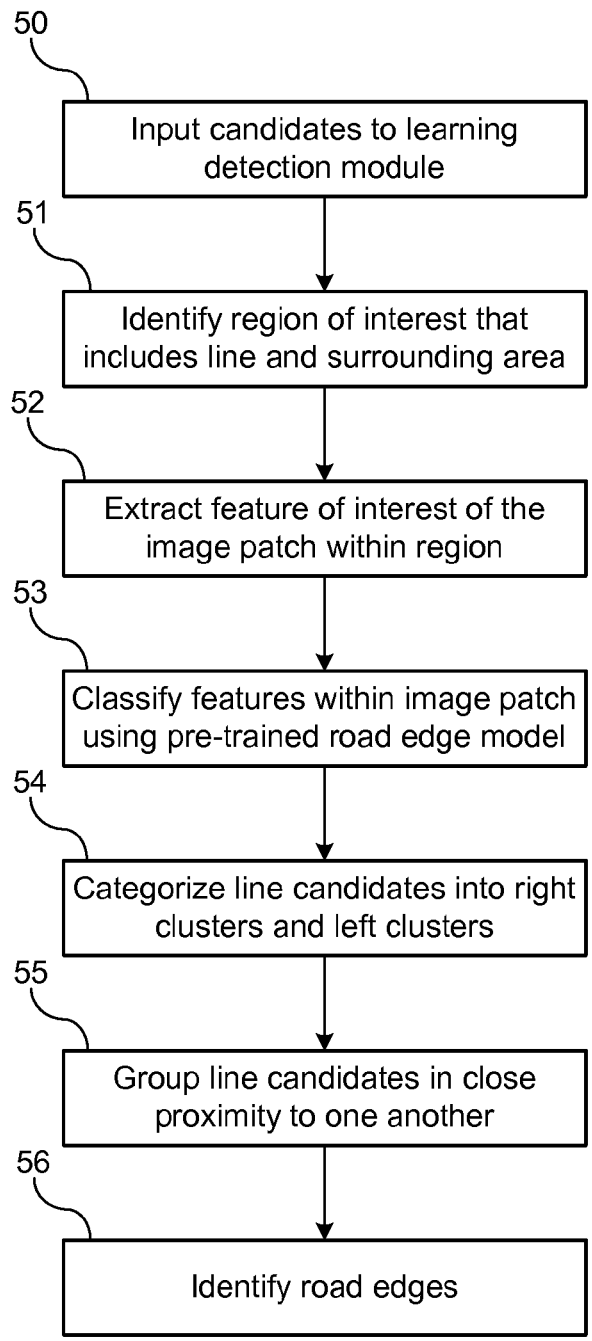
FIG. 5 illustrates the learning-based road edge detection technique.

The results from the road line clustering and vanishing point detection technique are provided to a learning-based road edge detection module. FIG. 5 illustrates a learned-based road edge detection technique.

In step 50, vanishing point candidates and line candidates are input to the learning-based road edge detection module as determined by the road line clustering and vanishing point detection technique.

Figure 6:
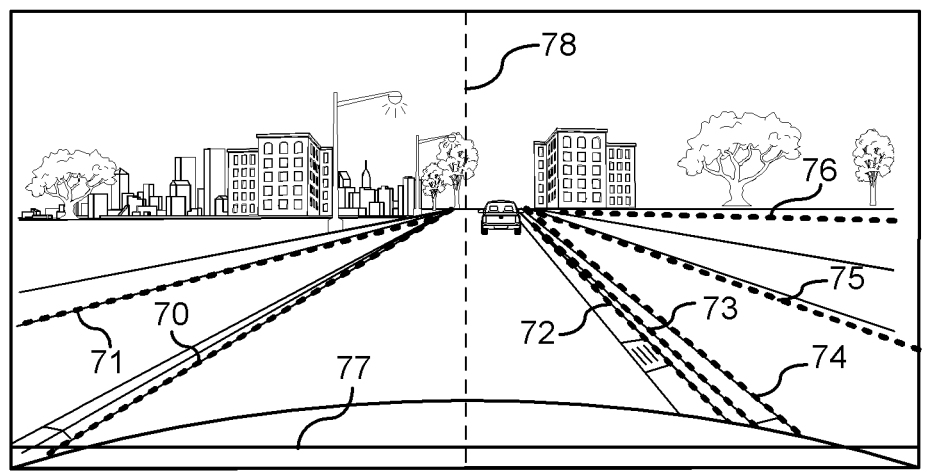
FIG. 6 illustrates an image of line candidates identifying road edges.

In step 51, for each identified line within an image of the next frame, a region of interest is identified in the image with respect to the region which includes the line and the surrounding region. The region is identified as an image patch and may be any type of boundary that encompasses the selected line such as a rectangle. It should be understood that the boundary is not limited to rectangles but may be a shape that sufficiently encases the selected line and surrounding region. An example of the candidate lines are shown in FIG. 6.

In step 52, features of the image patch within the region of the interest are extracted.

In step 53, classification of the features within the image patch is performed based on using a pre-trained road edge model (i.e., classifier). The classification identifies whether a respective feature is a road edge or not. Classification may be performed by selecting parameters that are used to provide a balance between what is identified as a road edge or not a road edge. It should be understood that road edge as used herein is intended to include lane markers, curbs, and other road structures or markings that define a boundary of a road. The classifier may be any classifier including, but is not limited to, a support vector machine or a neural network training program.

In step 54, the line candidates are categorized into right clusters and left clusters. Categorizing line candidates into each cluster may be based on the crossing location of each line candidate with respect to a selected horizontal row on the bottom of the image representing a vehicle hood line. That is, a bottom line (row) of the image is utilized for left and right line clusters grouping. Each detected road structure line is extended to cross at the bottom line of the image. The crossing location is compared to an imaginary vehicle center line extending vertically, which is assumed to be in the middle of the image. A line is grouped into a left edge candidate cluster if the respective line crosses on the left side of the imaginary center line and its distance to the center line is larger than half vehicle width (vehicle should not be outside of road edge). Similarly, a line is grouped into a right edge candidate cluster if the respective line crosses on the right side of the imaginary center line and its distance to the center line is larger than half vehicle width.

In step 55, line candidates that are in close proximity to one another are grouped as a single road edge. Each respective candidate road edge has a classification probability which provides a confidence value of whether it is a road edge or not. The confidence value is preferably based on a scale of 0 to 1. The confidence value assigned to each respective candidate road edge is assigned by the classifier. Within a grouping of road edges, the respective road edge having the maximum classification probability within the grouping is used as the confidence value for the formed grouping.

In step 56, road edges in the left cluster and/or right cluster having a confidence value of greater than a predetermined confidence threshold value is identified as a reliable road edge. Preferably a predetermined confidence threshold value of greater than 0.95 is utilized. However, a predetermined confidence threshold value other than 0.95 may be utilized.

FIG. 6 illustrates an example of candidate road edges 70-76 as highlighted in a captured image. Each of the line candidates will have an associated confidence value. Each line will be identified in a right cluster or a left cluster. For example, candidate lines 70 and 71 are located on the left side of the vehicle and are clustered into a left-side cluster. Candidate lines 72-76 are located on the right side of the vehicle and are clustered into a right-side cluster. A bottom line 77 and a centerline 78 are used to determine whether the respective candidate lines should be grouped into a left cluster or a right cluster. Bottom line 77 represents a vehicle hood line in the image for identifying a location of intersection with a respective candidate line. Centerline 78 represents the vehicle center line extending vertically, which is assumed to be in the middle of the image.

It is also shown in FIG. 6 that in the left-side cluster, only line candidate 70 crosses a bottom line 77 of the image which is a reliable indicator of a road edge. In reference to the right-side cluster, lines 72-74 cross the bottom line 77. It should be understood that although lines 71 and 75 cross the bottom line 77 at locations outside of the captured image as shown due to limited field of view of the camera, lines 71 and 75 should be added to the left and right clusters.

A road edge, such as a curb, may include several lines which are detected by the road structure module. Each line as well as its corresponding neighbor region by itself is not a good representative of the curb. Rather, a grouping of the lines and their surrounding region would cover the entire road edge transition from road surface to non-road surface outside of the curb. This grouping also provides more accurate road edge localization than any line in its respective group, which could help road edge tracking and detection in consequent frames.

To group the edge line candidates which belong to a single road edge, a distance between each of the potentially grouped lines and their orientation similarity is checked, as well as their classification probabilities. If two or more lines are found to be very close (e.g., <0.5 m on ground plane) and are substantially parallel, then each of the respective lines that satisfy the above criteria are grouped into one road edge candidate and their neighbor regions are grouped into one neighbor region. The respective feature is extracted from the grouped neighbor region, and input into a road edge classification module to refine its road edge probability.

FIG. 6 illustrates this example, in regards to the right-side cluster, and more specifically, to candidate lines 72-74, since the each of the respective candidate lines are in close range to one another, candidate lines 72-74 are grouped as a single road edge. Furthermore, candidate lines 72-74 each have a different confidence value that indicates the probability of the line candidate being a road edge. When grouped as a single road edge, the group as a whole will utilize the respective confidence value of a respective line candidate within the group having the highest confidence value relative to all confidence lines in that group. To group the edge line candidates which belong to a single road edge, a distance between each of the potentially grouped lines and their orientation similarity is checked, as well as their classification probabilities. If two or more lines are found to be very close (e.g., <0.5 m on ground plane) and are substantially parallel, then each of the respective lines that satisfy the above criteria are grouped into one road edge candidate and their neighbor regions are grouped into one neighbor region. For example, line candidate 72 may have a confidence value of 0.92, line candidate 73 may have a confidence value of 0.97, and line candidate 74 may have a confidence value of 0.94. When grouped as a single road edge, the grouping will utilize the confidence value of 0.97 which is the highest confidence value among the respective line candidates being grouped. As a result, line candidates from the right-side cluster and/or left-side cluster will be selected from the learning-based road-edge detection module as a reliable road edge that have confidence values greater than a threshold such as 0.95.

The selected reliable road-edges will be utilized in determining a road region so that a clear path within the road of travel can be identified. This reduces the false alarms of the clear path detection. By identifying the road boundaries in the captured image, regions that are identified as clear path regions that are inside the detected road edge boundaries are given higher confidence, and regions that are outside of the detected road edge boundaries are given lower confidence. This allows a clear path detection system to refine the clear-path detection result by using the identified road edge boundaries.

While certain embodiments of the present invention have been described in detail, those familiar with the art to which this invention relates will recognize various alternative designs and embodiments for practicing the invention as defined by the following claims.

What is claimed is:

1. A method of detecting road edges in a road of travel for clear path detection, the method comprising the steps of:
   capturing input images of a scene exterior of the vehicle utilizing an image capture device, the input images being captured at various time step frames;
   generating a transformed image from the captured image;
   performing edge analysis on the transformed image for detecting line candidates;
   identifying an initial vanishing point in the captured image as a function of the line candidates;
   tracking the line candidates identified in a next frame;
   estimating a vanishing point in the next frame based on the tracked line candidates;
   selecting respective line candidates in the next frame that are associated with the vanishing point of the next frame;
   identifying a region of interest in the captured image for each line candidate, each region of interest including a respective line candidate and a surrounding region of the respective line candidate;
   extracting features relating to the line candidate from the region of interest;
   inputting the extracted features to a classifier for identifying whether the line candidate is a potential road edge, the classifier assigning a confidence value to the line candidate that identifies a probability of whether the line candidate is a road edge; and
   identifying the potential line candidate as a reliable road edge based on the confidence value being greater than a predetermined value.

2. The method of claim 1 wherein generating a transform image includes generating an illumination intensity image and a yellow image from the captured image, and wherein edge analysis is performed on the illumination intensity image and the yellow image for detecting line candidates.

3. The method of claim 2 wherein performing edge analysis on the illumination intensity image and the yellow image includes identifying pixels associated with edges in each respective image and clustering the edge pixels having substantially similar gradient angles for detecting line clusters.

4. The method of claim 3 wherein clustering the edge pixels is further based on a local connectivity between edge pixels, wherein local connectivity includes forming a connective chain with successive pixels having a substantially similar gradient angle.

5. The method of claim 3 wherein the detected line clusters identified in the illumination intensity image and the yellow image are merged into a combined line cluster.

6. The method of claim 5 wherein the line candidates are identified in the combined line cluster by identifying bright strips in the combined line cluster, the bright strips transitioning from a dark region to a bright region to a dark region across a width of the entire line candidate, wherein the bright strips are line candidates representative of lane markers in the road of travel.

7. The method of claim 5 wherein the line candidates are identified in the combined line cluster by identifying dark strips in the combined line cluster, the dark strips transitioning from a bright region to a dark region to a bright region across a width of the entire line candidate, wherein the dark strips are line candidates representative of road curbs.

8. The method of claim 5 wherein the initial vanishing point is determined in a region where bright strips and dark strips merge.

9. The method of claim 8 wherein a location of the initial vanishing point is re-fined utilizing line candidates including bright strips and dark strips within a predetermined range of one another.

10. The method of claim 5 wherein the line candidates are identified in the combined line cluster by lines having at least a predetermined length in the combined line cluster, wherein lines greater than a predetermined distance within the combined line cluster are identified as line candidates representative of the potential road edges.

11. The method of claim 1 wherein tracking the line candidates includes determining whether line candidates in the next frame match the line candidates from the previous frame, and wherein if a match is found a respective matching line candidate in the next frame is utilized for estimating the vanishing point of the next frame.

12. The method of claim 1 wherein the vanishing point in the previous frame is used to define a search region for vanish point detection in the next frame.

13. The method of claim 1 wherein identifying a region of interest in the capture image for each line candidate includes selecting a region that is a predetermined distance on each side of the line candidate.

14. The method of claim 1 wherein the classifier is based on a pre-trained road-edge model for estimating whether a respective line candidate is a road edge based as a function of the extracted features analyzed by the classifier.

15. The method of claim 1 wherein the classifier includes a support vector machine for classifying each line candidate.

16. The method of claim 1 further comprising the step of categorizing the line candidates into a left-side cluster and a right-side cluster, wherein a respective line candidate is categorized into the left-side cluster when the respective line candidate crosses a left side of a hood line of the vehicle within the captured image, wherein a respective line candidate is categorized into the right-side cluster when the respective line candidate crosses a right side of the hood line of the vehicle within the captured image, and wherein the right side of the hood line and the left side of the hood line are separated by a centerline extending longitudinally along a center of the vehicle.

17. The method of claim 16 wherein a respective set of line candidates within a respective cluster are grouped as a single line candidate when the set of line candidates satisfy a grouping criteria, the grouping criteria including a maximum spacing threshold between the respective set of line candidates.

18. The method of claim 17 wherein a respective line candidate within a group having a highest confidence value among the line candidates within the grouping is used as the confidence value for the formed grouping.

19. The method of claim 1 wherein further comprising the step of inputting the identified road edges and corresponding confidence map into a clear path detection technique for assisting clear path detection.

20. The method of claim 1 wherein generating a transformed image includes utilizing a color transformation for generating an image that is an average of a red channel and a green channel.

\* \* \* \* \*